US005957099A

United States Patent [19]

Kobayashi et al.

[11] Patent Number: 5,957,099

[45] Date of Patent: Sep. 28, 1999

[54] AIR-COOLED ENGINE FOR GENERAL USE

[75] Inventors: Kazuyuki Kobayashi; Hiroyoshi Kouchi; Shogo Nakamura, all of Aichi-ken, Japan

[73] Assignee: Mitsubishi Heavy Industries, Ltd., Nagoya, Japan

[21] Appl. No.: 09/104,397

[22] Filed: Jun. 25, 1998

[30] Foreign Application Priority Data

Jun. 26, 1997 [JP] Japan .................................... 9-185810

[51] Int. Cl.$^{6}$ .................................................. F16H 7/06

[52] U.S. Cl. .................................... 123/90.31; 123/376

[58] Field of Search ................................ 123/90.31, 376

[56] References Cited

U.S. PATENT DOCUMENTS

| | | | |
|---|---|---|---|
| 4,457,269 | 7/1984 | Beardmore | 123/90.31 |
| 4,879,977 | 11/1989 | Restelli | 123/90.31 |
| 5,058,458 | 10/1991 | Odai | 123/90.31 |
| 5,295,459 | 3/1994 | Suzuki et al. | 123/90.31 |
| 5,327,859 | 7/1994 | Pierik et al. | 123/90.31 |

FOREIGN PATENT DOCUMENTS

| | | |
|---|---|---|
| U 60-178645 | 11/1985 | Japan . |
| U 64-17054 | 1/1989 | Japan . |
| 1-193433 | 8/1989 | Japan . |
| U 6-43396 | 6/1994 | Japan . |

*Primary Examiner*—Weilun Lo

*Attorney, Agent, or Firm*—Evenson, McKeown, Edwards & Lenahan, P.L.L.C.

[57] ABSTRACT

The objective of this invention is to solve two sorts of problems in an engine using a chain transmission scheme with the camshaft as the output shaft. One set of problems results from the stretching of the chain. The other concerns lining up the crankshaft and camshaft during assembly. With this invention, power is transmitted from the crankshaft to the camshaft by means of a silent chain. The silent chain is tensioned before use to suppress its initial tendency to stretch. The chain is installed so that the slack in the chain is 1 to 2% looser than its theoretically calculated distance value between the crankshaft and the camshaft. (A chain tensioner is not used.) One or several marks are provided on the opposed surfaces of the aforesaid silent chain and the two sprockets to help match the positions of the crankshaft and camshaft.

3 Claims, 7 Drawing Sheets

AIR-COOLED ENGINE FOR GENERAL USE

FIELD OF THE INVENTION

This invention concerns a multipurpose air-cooled engine in which the camshaft is used as the output shaft. More specifically, it concerns a multipurpose air-cooled four-cycle engine in which a chain is used to transmit the rotation of the crankshaft to the camshaft, and the said camshaft is used as the output shaft.

BACKGROUND OF THE INVENTION

Multipurpose air-cooled four-cycle engines have various requirements depending on what sort of working machine the engine is to serve. A compressor, an axial-flow pump, or an outboard engine directly connected to the propeller shaft requires high-speed revolution, so for these applications the crankshaft is used as the output shaft. Much farm equipment, on the other hand, requires low-speed output. Since the camshaft has a rotary speed half that of the crankshaft, it is used as the output shaft for this sort of application.

We shall now discuss, with reference to FIGS. 6 and 7, an example of the prior art, a four-cycle engine in which the crankshaft is used as the output shaft. (Reference: Japanese Patent Publication (Kokai) Hei 1-193433).

FIG. 6 is a frontal cross section of a four-cycle overhead-valve engine. FIG. 7 is a lateral cross section. In these drawings, 1 is the crankcase; 2 is the cylinder with its cooling fins; 2*a* is the lower end of cylinder 2; 3 is the piston which slides up and down against the interior wall of the aforesaid cylinder; 4 is the connecting rod which joins piston 3 and crank pin 5*b*; and 5 is the crankshaft. The crankshaft 5 comprises shaft portions $5c_1$ and $5c_2$, crank arms 5*a* and crank pin 5*b*. The said shaft portions $5c_1$ and $5c_2$ are supported at two points by bearings mounted on crankcase 1. Gear 6, which drives the cam, is attached to shaft portion $5c_1$ on the output side of the aforesaid crankshaft 5. The rotary force of crankshaft 5 is transmitted to camshaft 7 via cam gear 8. Exhaust/intake valves 11 are opened and closed by the operation of cams 7*a*, tappets 9 and rocker arms 10.

Camshaft 7 is also supported at two points by sliding bearings mounted on crankcase 1.

Governor G is engaged with cam drive gear 6 in crankcase 1. It detects the speed at which crankshaft 5 is rotating and controls the speed of rotation. Flywheel 12 is mounted on shaft portion $5c_2$, which protrudes from crankcase 1 to the exterior on the side of the crankshaft opposite the output side.

In engines which employ the camshaft as the output shaft, the standard arrangement used in industry in order to standardize multipurpose engines is to have the output shaft rotate to the left if viewed from the output side. In an engine in which crankshaft 5 and camshaft 7 are linked via gears 6 and 8 (hereafter referred to as the "gear transmission scheme"), as can be seen in the aforementioned FIGS. 6 and 7, crankshaft 5 must be made to rotate in the direction opposite that in which it would rotate if it were the output shaft. Accordingly, a flywheel, a recoil starter or the like must be employed to provide opposite rotation. This has the result of increasing the number of different types of components needed (i.e., the parts count). Furthermore, a number of parts must be added in order to use the part for both leftward and rightward rotation, such as shrouds to guide the cooling air. This must become the engine larger to accommodate the extra parts.

To address the shortcomings of the above-described gear transmission scheme in an engine which employs the camshaft as the output shaft, a chain transmission scheme has been suggested by which the camshaft and the crankshaft are connected by means of two sprockets and a chain. This chain transmission scheme has the benefit that the camshaft and crankshaft have the same direction of rotation. On the other hand, when the camshaft is used as the output shaft, the entire output is transmitted from the crankshaft to the camshaft through the chain, so when the chain stretches a timing lag may result. The shock which occurs when engine braking is applied also poses a problem, as does noise. Lining up the crankshaft and camshaft during assembly (i.e., matching the timing) is also problematic.

To address the problem of chain noise, the use of a silent chain has been suggested. (Japanese Utility Model Publications Showa 60-178645, Heisei 6-43396 and Showa 64-17054).

An example of a silent chain is pictured in FIG. 3.

FIG. 3(A) is a lateral view of the chain with the sprocket engaged (In (A) guide plates 274 are not shown.). (B) is a cross section taken along line A—A. (C) is a plan view. In the drawings, 25*a* (26*a*) is the crown of the gear tooth of sprocket 25 (26). 271 and 272 are link plates. As can be seen in (A), there is a depression 272*a* in the middle of each plate in which the aforesaid crown of the gear tooth 25*a* (26*a*) engages. The left and right sides of the plate project like tongues to correspond to the crown of the gear tooth. Pin holes 272*b* are formed in the upper portion of the plate.

As can be seen in FIGS. 3(B) and (C), the said link plates 271 and 272 are arranged in three layers. Plate 271, which forms the middle layer, is placed at a distance from plates 272 which is equal to one pitch 25*a* (26*a*) of the crown of the gear tooth. This entire structure is supported at guide plates 274, which are on either side of it, by pin 273 in such a way that it is free to rotate.

To be more specific, there are three link plates, 272, 271 and 272, which are standing in a row. The link plates 272 to the right and left are offset with respect to the central link plate 271 by a single pitch of the crowns of the gear teeth along the length of the chain. The lateral surfaces of the three link plates 271 and 272 partially overlap each other. In this way a large number of link plates is connected lengthwise to form a chain.

As is shown in FIGS. 4(*b*) and (*c*), guide plates 274 are shaped like segments of a ring. The said plates 274 are provided on both sides of the chain and, as can be seen in (*b*), they are placed on either side of the aforesaid gear teeth 25*a* (or 26*a*). The purpose of these guide plates 274 is to insure that the aforesaid link plates 271 and 272 cannot shift laterally with respect to gear teeth 25*a* (or 26*a*) of sprocket 25 (or 26).

The aforesaid link plates 271 and 272 and guide plates 274 are linked together by pins 273, which are inserted into holes 272*b* once the holes in the link plates have been aligned with those in the guide plates. These pins support the plates axially in such a way that they are free to rotate. This constitutes the configuration of silent chain 27.

When the silent chain is used in the chain transmission scheme, and the cam shaft is used as the output shaft, as has been described above, we can solve two problems inherent in other transmission schemes. One is the proliferation of components required by gear transmission schemes because of the reverse rotation of the crankshaft or, if single components are made to serve both rotations, the resulting bulkiness of the engine. This can be ameliorated and the engine can be made smaller. The other problem, which is inherent to chain transmission schemes, is noise. This too can be solved by the present scheme. However, a number of problems remain: for example, the timing can shift as the chain stretches; a shock is generated when engine braking is applied; and it is difficult to match the phases of the crankshaft and camshaft (i.e., to match their timing) when the engine is being assembled.

SUMMARY OF THE INVENTION

In view of these technical problems, our objective in designing this invention is to provide an engine using the camshaft as the output shaft which would eliminate both problems resulting from the chain stretching, which are inherent in chain transmission schemes, and the problem of matching the phases of the crankshaft and camshaft during assembly.

A fundamental aspect of this invention is that a silent chain of the type available on the market for high speed and heavy load applications, whose design mitigates any lost motion of the chain, is used to transmit the power from the crankshaft to the camshaft. The first preferred embodiment of the invention is distinguished by the fact that after the aforesaid silent chain is first tensioned and its elongation is controlled, the distance between the crankshaft and the camshaft is set so as to make the chain 1 to 2% looser than its theoretically calculated value before the chain is installed.

This invention solves the problem of timing shifts which result from elongation of the chain as well as the problem of shock when engine braking is applied.

When gear transmission is used, the phase (i.e., the timing) of the crankshaft and camshaft are matched by aligning timing marks M, which are engraved on both crank gear 43 and cam gear 44, as can be seen in FIG. 4(*a*). In chain transmission, since the marks are engraved on sprocket 25 (or 26), so they are further away from their opposite marks. This makes it rather difficult to determine whether the marks have been matched correctly.

The second preferred embodiment of the invention is distinguished by the fact that one or more timing marks for the purpose of matching the positions of the crankshaft and camshaft are provided on the aforesaid silent chain and sprocket where the two face each other.

With this invention, the positions of the crankshaft and camshaft are matched using the chain. Timing marks are engraved on both the sprocket and the chain links. When these marks are lined up so that they are adjacent to each other, the crankshaft and camshaft are in the proper relation. This method is accurate and easy. And because the chain has already been tensioned and its initial elongation has been controlled, the aforesaid result is further enhanced.

With this invention, if half of the total number of links in the chain is an odd number, two timing marks should be provided on either the sprocket or the chain. This will prevent an error from occurring in the timing position when the chain is hung.

The third preferred embodiment of the invention is distinguished by the fact that the engine according to this invention has a governor gear to drive a governor on the portion of the crankshaft at the opposite position of the crank sprocket. The governor, which is enclosed in the crankcase on the same side as the cooling fan, can rotate through the mediation of the said gear.

To be more specific, the governor, which is driven by a gear for that purpose, is enclosed in the crankcase on the side opposite that in which the chain transmission mechanism is located.

With this invention, the chain mechanism (consisting of the sprocket and the silent chain) is on the output side of the camshaft and the governor to control the speed of the engine and the gear to drive that governor are on the opposite side, where the cooling fan is located. The interior of the crankcase is divided in two spaces by this arrangement. This arrangement makes it easy to downsize the crankcase. It can also be used in a gear-transmission type engine in which the crankshaft is the output shaft where most of the components are suitable for an engine of either rotational direction.

BRIEF DESCRIPTION OF THE DRAWINGS

FIG. 1 is a frontal view of a cross section showing the essential parts of this engine.

DETAILED DESCRIPTION OF THE INVENTION

In this section we shall give a detailed explanation of several ideal embodiments of this invention with reference to the drawings. To the extent that the dimensions, materials, shape and relative position of the components described in this embodiment are not definitely fixed, the scope of the invention is not limited to those specified, which are meant to serve merely as illustrative examples.

Figure 1:
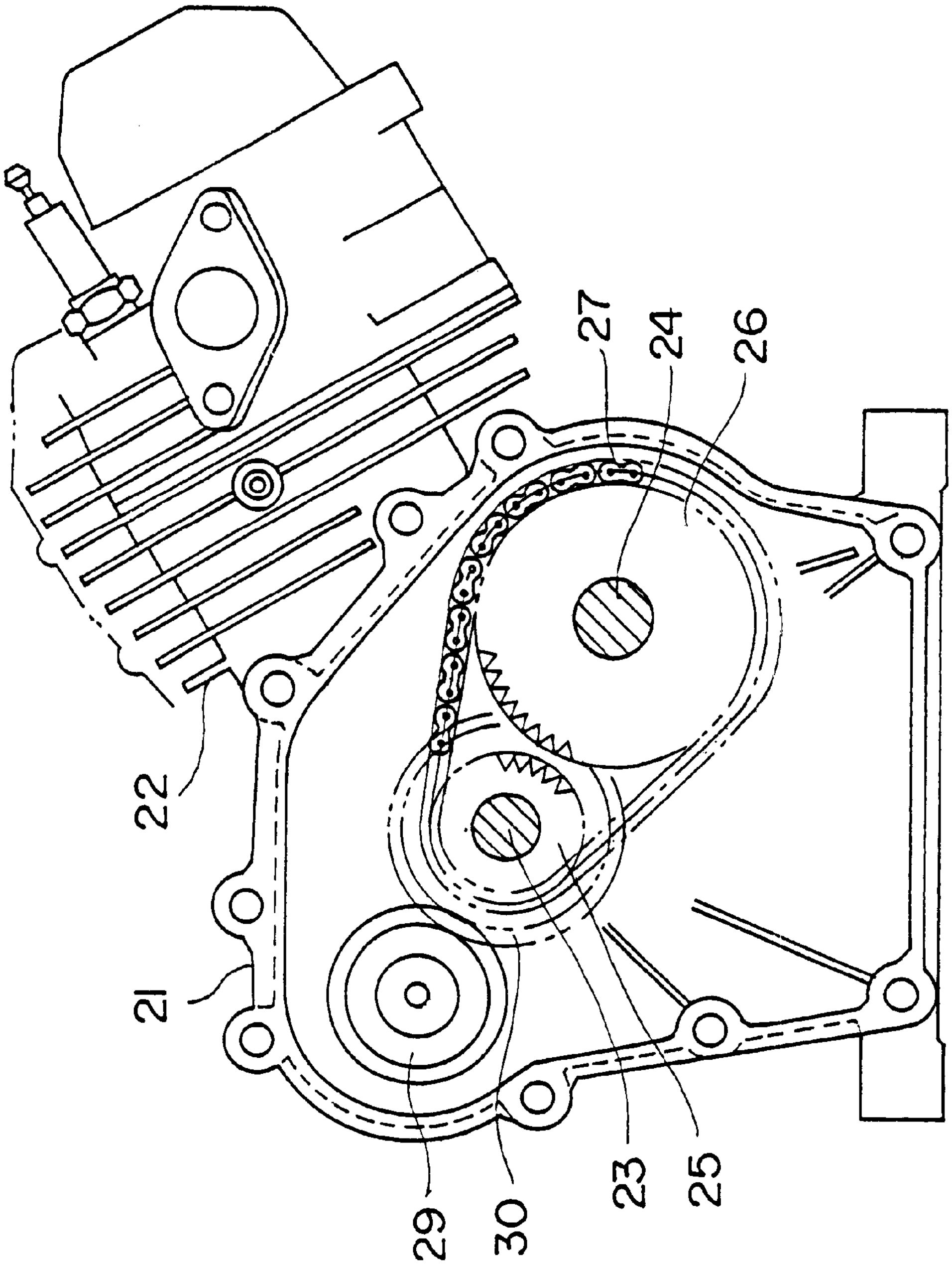
FIG. 1 shows an inclined-cylinder type multipurpose four-cycle engine with overhead valves in which the camshaft is used as the output shaft. This engine is an ideal embodiment of the present invention.
Figure 2:
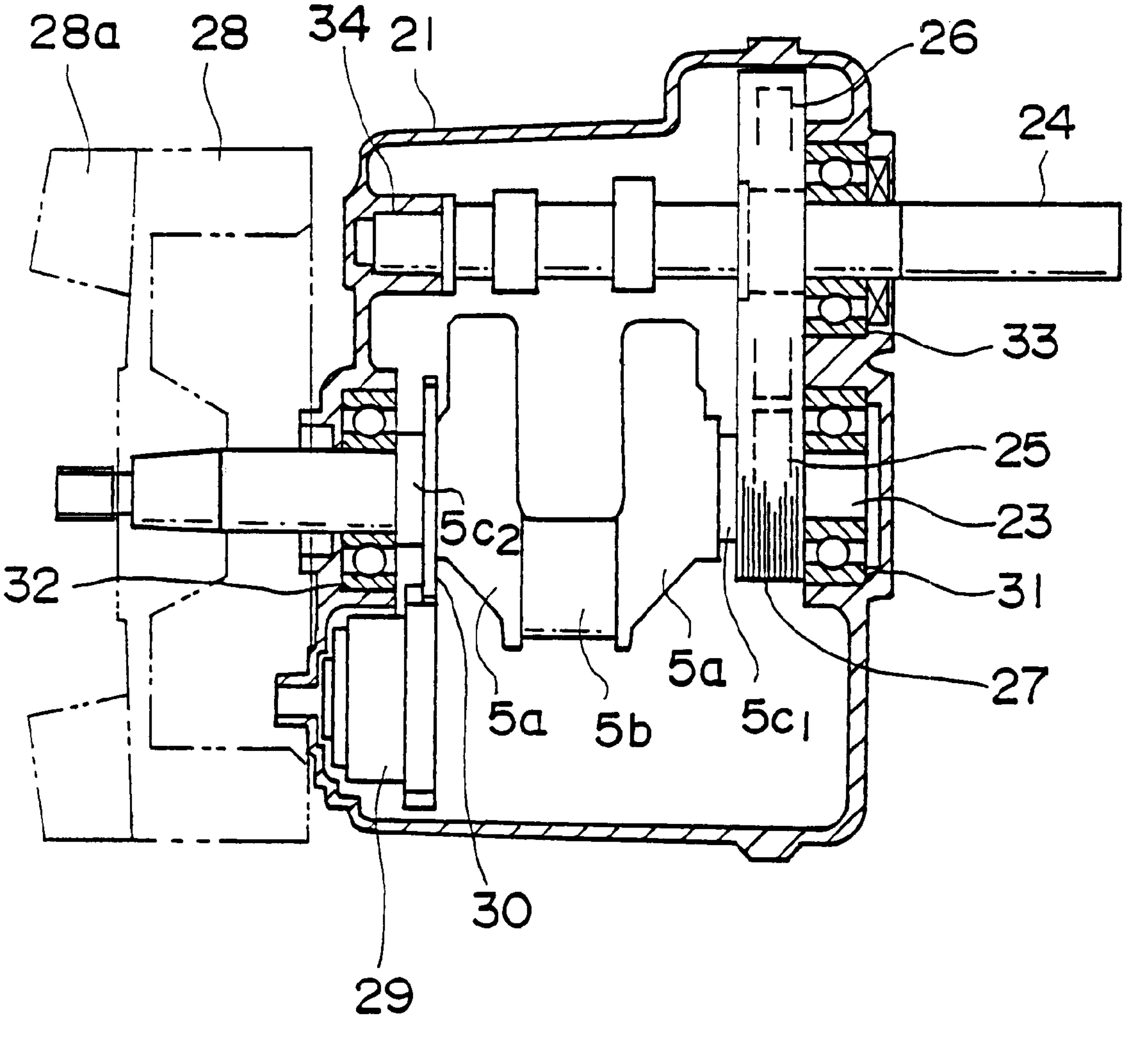
FIG. 2 is a cross sectional plan view of the engine in FIG. 1.

FIGS. 1 and 2 show an inclined-cylinder type multipurpose four-cycle engine with overhead valves in which the camshaft is used as the output shaft. This engine is an ideal embodiment of the present invention. FIG. 1 is a frontal view of a cross section showing the essential parts of this engine. FIG. 2 is a cross sectional plan view.

In FIG. 1, 21 is the crankcase; 22 is the cylinder, which extends obliquely upward; 23 is the crankshaft, which is placed in the upper midsection of crankcase 21; 24 is the camshaft, which is placed below cylinder 22 in crankcase 21; 25 is the crank sprocket, which is attached to crankshaft 23; 26 is the cam sprocket, which is attached to camshaft 24; 27 is the silent chain, which is hung between crank sprocket 25 and cam sprocket 26. The diameter of sprockets 25 and 26 is chosen so that the rotational speed, which is transmitted to camshaft 24 through the aforesaid sprockets 25 and 26 and chain 27, will be one half that of crankshaft 23.

29 is the governor to adjust the speed of rotation, which is driven by the rotation of the aforesaid crankshaft 23. The governor is enclosed in crankcase 21 on the opposite side from the aforesaid camshaft 24 and, as can be seen in FIG. 2, on the same side as cooling fan 28*a*, which is opposite the output side of crankshaft 23. Governor 29, which is attached to crankshaft 23, engages with drive gear 30.

In FIG. 2, crankshaft 23 comprises crankshaft portions $5c_1$ and $5c_2$, crank arms 5*a* and crank pin 5*b*. Portion $5c_2$ of crankshaft 23 protrudes from crankcase 21. Flywheel 28 is attached to the protruding portion. Cooling fan 28*a* is mounted to exterior flywheel 28 in such a way as to be integral to it.

31, 32, 33 and 34 are ball bearings and sliding bearings which support crankshaft 23 and camshaft 24, respectively, at two points. Ball bearing 31 on the side of crankshaft 23 driven by the chain should be of a larger diameter and a larger load capacity than ball bearing 32 on the side where cooling fan 28*a* is located. Similarly, a large-diameter, large load-capacity bearing should be used for ball bearing 33 on the chain-driven side of camshaft 24, while a sliding bearing 34 can be used on the side where cooling fan 28*a* is located. This arrangement will reduce both the cost of the engine and the parts count. Parts such as the piston and the connecting rod, which are not related to this invention, have been omitted from the drawing.

Figure 3:
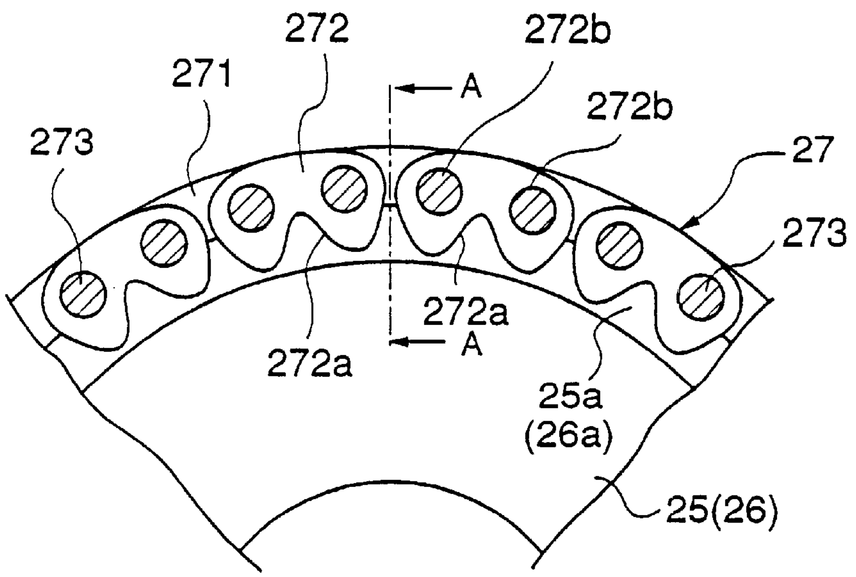
(Prior Art) Figure 3 (A)
FIG. 3 shows the configuration of a silent chain according to the prior art. (A) is a lateral view of the chain with the sprocket engaged. (In (A) guide plate 274 is not shown.) (B) is a cross section taken along line A—A. (C) is a plan view.
Figure 3:
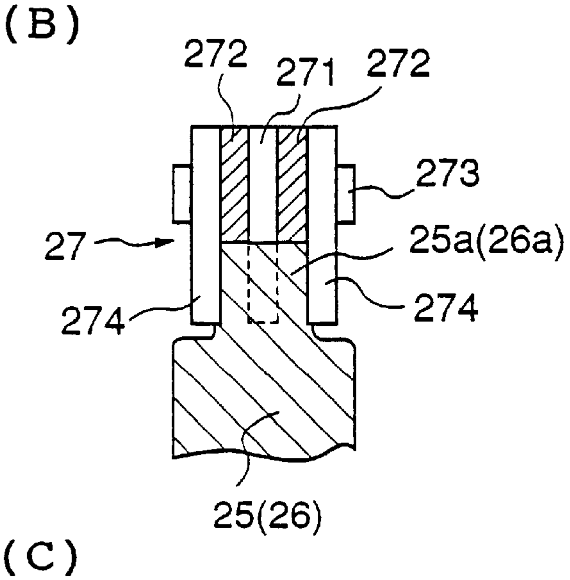
Figure 3:
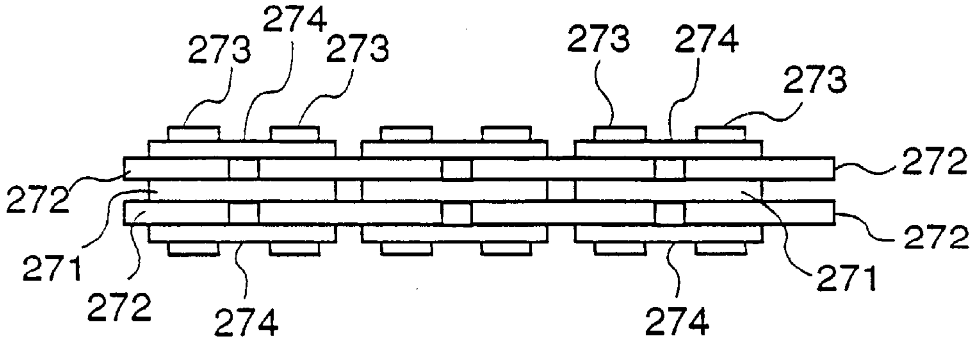

Silent chain 27 may be, but is not limited to, the type of chain pictured in FIG. 3. The two pins 273 which are inserted through the holes in link plates 271 serve as the fulcrum. When adjacent link plates 271 and 272 are bent relative to each other, their point of contact is shifted to the side. The front portions of the teeth in link plates 272 and 272 have the shape of an involute rack. The movement of sprockets 25 and 26 in the axial direction employs a scheme in the public domain by which guide links 274 restrict the front portions of sprocket teeth 25*a* and 26*a*.

When a silent chain 27 which makes use of this scheme passes over sprockets 25 and 26, the lost motion which is peculiar to chains is suppressed, making the chain ideally suited to low-noise, high-speed and high-load capacity applications.

In this embodiment, the aforesaid silent chain 27 is tensioned when it is manufactured, so there is no initial stretching as would ordinarily occur with use. In addition, the effective length of the chain can be controlled with great accuracy and the degree of slack can be fixed. More specifically, the slack can be set 1 to 2% looser than the distance between the centers of sprockets 25 and 26 when the chain is hung on the sprockets. And because this embodiment is able to achieve accurate timing, there is no need for a chain tensioner.

Figure 4:
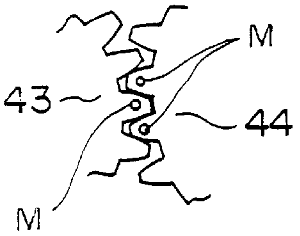
Figure 4 (a) (Prior Art)
FIGS. 4(*a*), (*b*) and (*c*) illustrate how the timing marks are used. (*a*) shows timing marks for a gear transmission scheme according to a prior art. (*b*) and (*c*) show timing marks for chain transmission scheme according to this invention.
Figure 4:
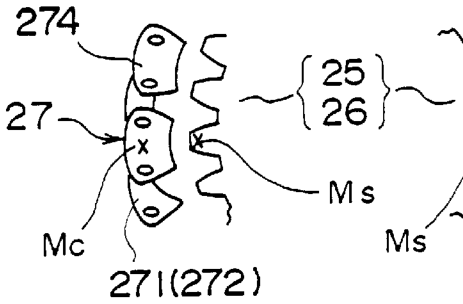
Figure 4:
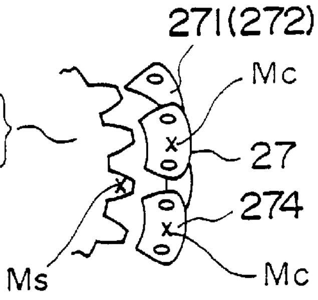
Figure 8:
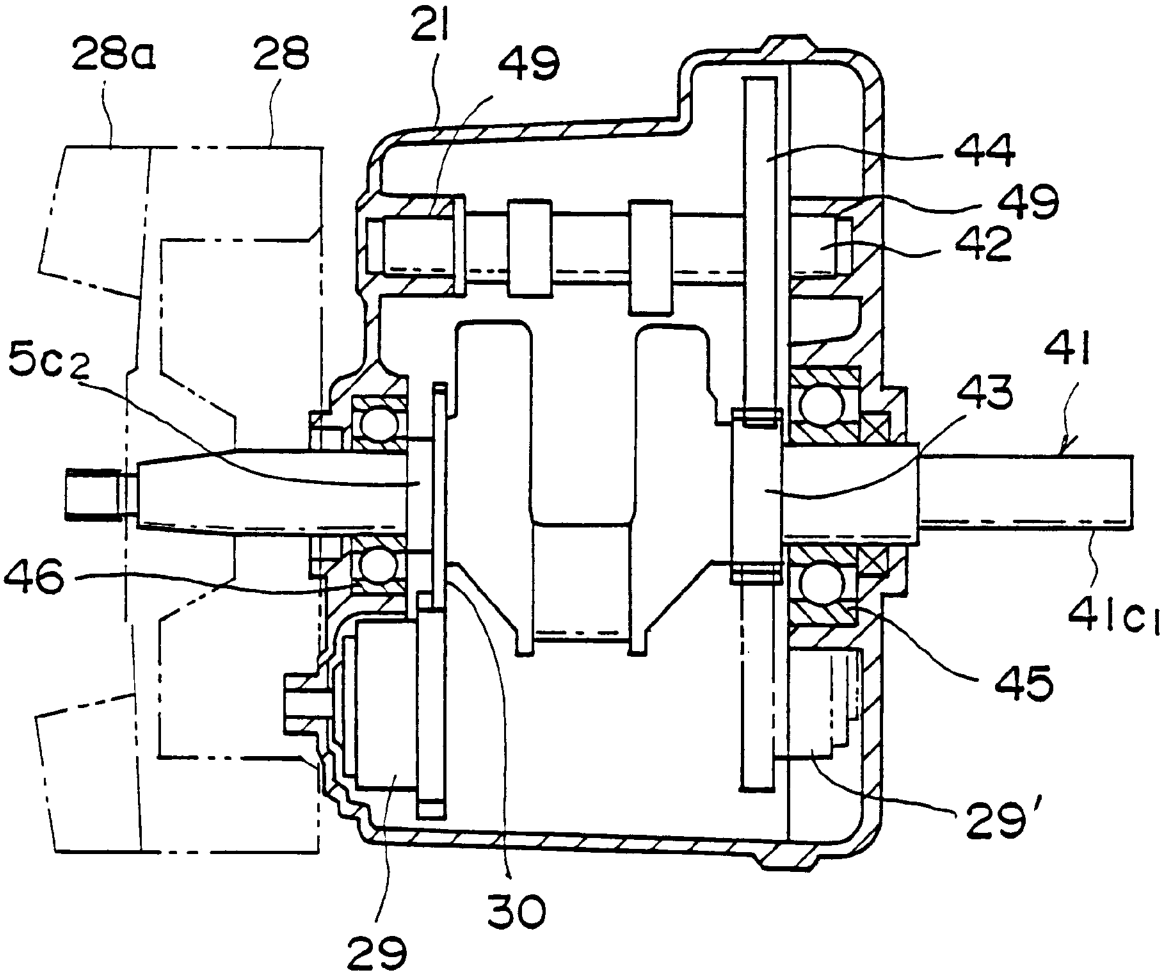
FIG. 8 is a frontal cross section of the engine in FIG. 1 which has now been converted to a gear-drive transmission scheme with the crankshaft as the output shaft according to this invention.

As can be seen in FIG. 4(*a*), when the gear transmission scheme pictured in FIG. 8 is used, the positions (i.e., the timing) of crank sprocket 25 and cam sprocket 26 are matched by lining up the (timing) marks M engraved on crank gear 43 and cam gear 44. When a chain transmission scheme is used, as in this embodiment, the timing marks on crank sprocket 25 and cam sprocket 26 are further apart, and it becomes more difficult to determine whether they are correctly aligned. In this invention, as can be seen in FIG. 4(*b*), timing marks $M_s$ and $M_c$ are engraved on crank sprocket 25 and cam sprocket 26 and on silent chain 26, respectively. The positions (i.e., the timing) can be matched using silent chain 27 easily.

If half of the total number of links in silent chain 27 is an odd number, the position on sprocket 25 (or 26) which corresponds to a peak on sprocket 26 (or 25) will be a valley. In this case, as is shown in FIG. 4(*c*), a number of timing marks $M_c$ (here, two) can be engraved on the chain for each mark $M_s$ on the opposite sprocket 26 (or 25).

Instead of engraving the timing marks on silent chain 27, links of a different color could be used.

Figure 5:
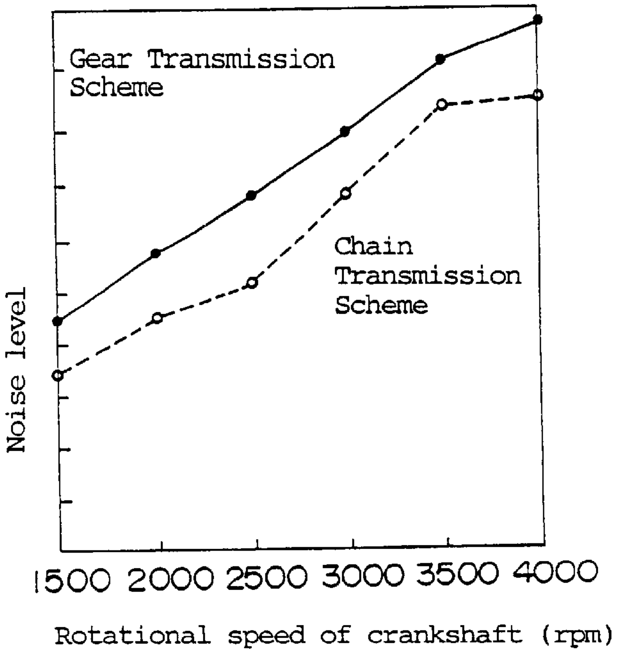
FIG. 5 is a graph of experimental results which show the effective noise reduction obtained by this invention.
Figure 6:
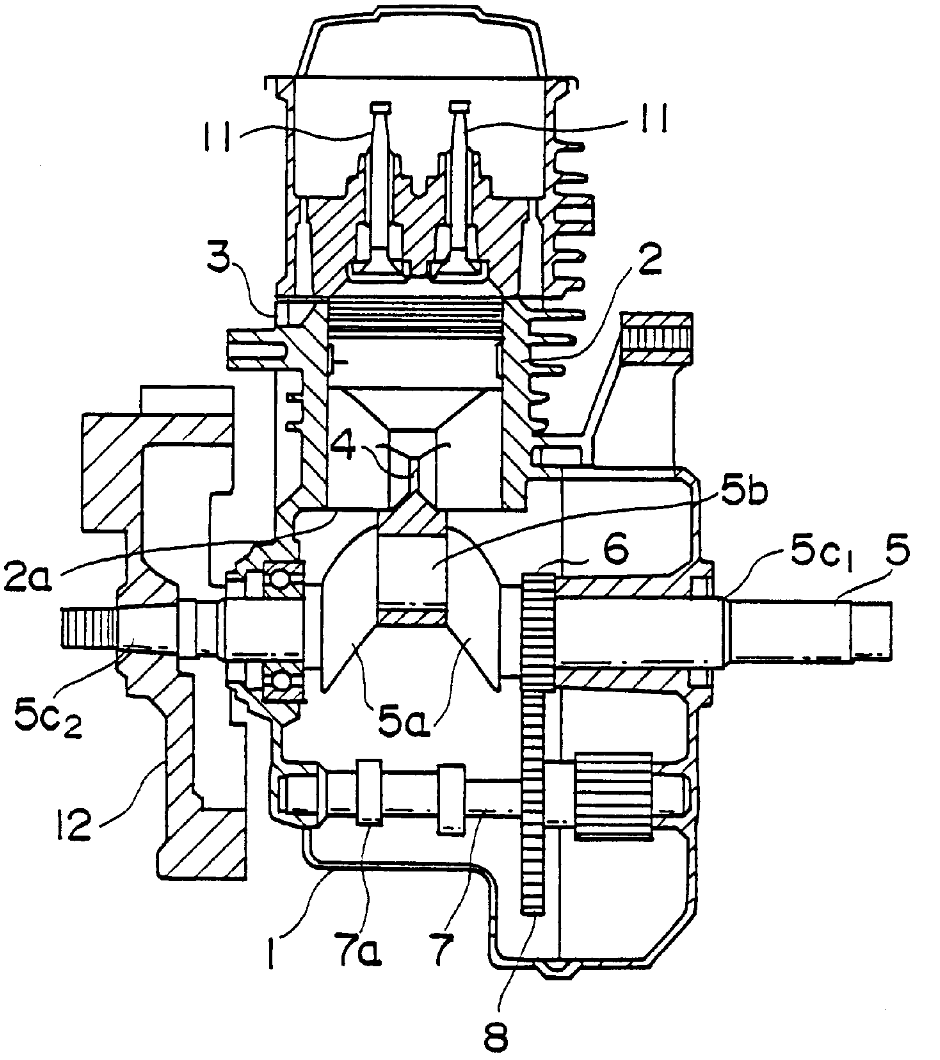
Figure 6 (Prior Art)
FIG. 6 is a frontal cross section of an engine using a prior art gear transmission scheme.
Figure 7:
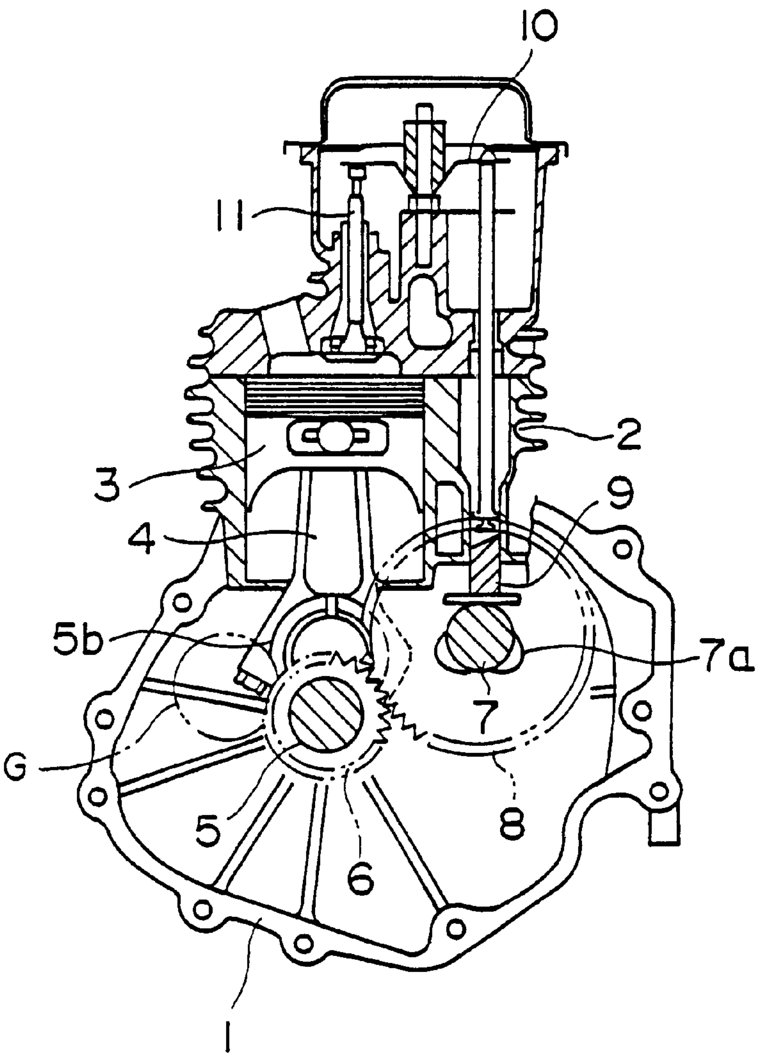
Figure 7 (Prior Art)
FIG. 7 is a lateral cross section of the engine in FIG. 6.

The graph in FIG. 5 gives experimental results which show the effective noise reduction obtained by this invention over a gear transmission scheme.

As the result of this experiment clearly shows, the use of silent chain 27 in the configuration described above effectively reduces both noise and vibration.

The fact that the governor in this embodiment is placed at the place as described above, makes it easy to use many parts not only for the chain-driven engine, but also for a gear-driven engine in which the crankshaft is used as the output shaft.

FIG. 8 is an embodiment of this invention in which the aforesaid engine has been converted to an engine with a gear-drive transmission scheme. Focussing on the aspects of the engine which differ from those in FIG. 2, we note that crankshaft 41 is the output shaft, and that portion $41c_1$ protrudes from crankcase 21. Since camshaft 42 is not used as the output shaft, it is supported in two places by sliding bearings 49. 43 is a crank gear (the cam drive gear) attached to crankshaft 41. 44 is the cam gear, which is attached to camshaft 42. 45 and 46 are ball bearings which support crankshaft 41. The ball bearings 46 on the output shaft may be the same size as in FIG. 2, or, as in this drawing, they may be of greater diameter than those in FIG. 2.

In the prior art, governor 29 would have been placed in position 29', which is indicated by broken lines in the drawing; it would engage with and be driven by crank gear 43. In this embodiment, however, a drive gear 30 for the governor is attached to crankshaft portion $5c_2$ on the opposite side of the engine where cooling fan 28*a* is located. Governor 29, which regulates the engine speed, is also moved over to same side as cooling fan 28*a*. An engine using a chain transmission scheme can be converted to gear transmission merely by substituting a small number of components.

With this invention, as has been discussed above, the crankshaft and the camshaft rotate in the same direction. This allows the cooling shroud to be made smaller, with the result that the entire engine can be downsized. In addition to its fundamental effect of greatly reducing engine noise, this invention solves all problems resulting from the chain stretching, as well the problem of aligning the positions of the crankshaft and camshaft during assembly.

Further, with this invention, a large number of parts can also be used in an engine with a gear transmission scheme in which the crankshaft serves as the output shaft. If both types of engine are being produced, this invention will have the effect of reducing the parts count and so contribute toward lowering the cost.

We claim:

1. An air-cooled multipurpose engine in which a chain is run between a crank sprocket for a crankshaft and a cam sprocket for a camshaft, a rotation of said crankshaft is transmitted to said camshaft via said sprockets and chain; and said camshaft is used as an output shaft, wherein said chain is a silent chain which is pre-processed for suppressing an incipient elongation by tensioning said silent chain so as to have 1 to 2% looser than a theoretically calculated distance value between said crankshaft and camshaft.

2. An air-cooled multipurpose engine according to claim 1, wherein said silent chain, said crank sprocket and cam sprocket have one or more timing marks respectively to coordinate a timing phase.

3. An air-cooled multipurpose engine according to claim 1, further comprising a governor gear and a governor provided on a side opposite a chain transmission mechanism using said silent chain.

* * * * *